(12) United States Patent
Visscher

(10) Patent No.: US 7,395,890 B2
(45) Date of Patent: Jul. 8, 2008

(54) SNOWMOBILE TRACK SUSPENSION

(75) Inventor: Peter Visscher, Dashwood (CA)

(73) Assignee: the University of Western Ontario, London (CA)

( * ) Notice: Subject to any disclaimer, the term of this patent is extended or adjusted under 35 U.S.C. 154(b) by 290 days.

(21) Appl. No.: 11/329,281

(22) Filed: Jan. 11, 2006

(65) Prior Publication Data
US 2006/0169510 A1 Aug. 3, 2006

Related U.S. Application Data

(60) Provisional application No. 60/642,508, filed on Jan. 11, 2005.

(51) Int. Cl.
*B62M 29/00* (2006.01)
(52) U.S. Cl. ........................ 180/193; 180/190; 180/186; 180/9.5; 180/9.52; 180/9.54
(58) Field of Classification Search ................ 180/193, 180/190, 186, 9.5, 9.52, 9.54, 9.56
See application file for complete search history.

(56) References Cited

U.S. PATENT DOCUMENTS

| | | | | |
|---|---|---|---|---|
| 4,826,260 A | * | 5/1989 | Plourde | ...................... 305/120 |
| 5,904,216 A | * | 5/1999 | Furusawa | ................... 180/193 |
| 6,234,264 B1 | * | 5/2001 | Boivin et al. | ................ 180/193 |
| 6,390,219 B1 | | 5/2002 | Vaisanen | |
| 6,991,057 B2 | * | 1/2006 | Imamura et al. | ............ 180/193 |
| 2004/0159483 A1 | * | 8/2004 | Imamura et al. | ............ 180/190 |

* cited by examiner

*Primary Examiner*—Lesley D. Morris
*Assistant Examiner*—Michael Stabley
(74) *Attorney, Agent, or Firm*—Brunet & Co.; Robert A.H. Brunet

(57) ABSTRACT

A rear track suspension for a snowmobile having a single resilient element for biasing both the front and rear arms. The slide rail is permitted to pitch between first and second pitching constraints in response to terrain obstacles in a gradual manner as the motion constraints are approached. This reduces jarring of the rider when the pitching constraints are met. Suspension compression exhibits an initial falling rate motion ratio, followed by a constant rate motion ratio, followed by a rising rate motion ratio. This U-shaped motion ratio profile advantageously provides cushioning upon landing along with a resistance to bottoming out of the suspension upon full compression. The result is an improved ride without sacrificing suspension performance.

20 Claims, 9 Drawing Sheets

SNOWMOBILE TRACK SUSPENSION

CROSS-REFERENCE TO RELATED APPLICATIONS

This application claims the benefit of U.S. patent application 60/642,508, filed Jan. 11, 2005, which is incorporated herein by reference.

FIELD OF THE INVENTION

The invention relates to rear track suspensions for snowmobiles. More particularly, the invention relates to a rear track suspension wherein the front and rear suspension arms interact to varying degrees as the suspension travels through its full range of motion. Even more particularly, the invention relates to rear track suspension wherein movement of both the front and rear suspension arms is dampened using a single resilient element.

BACKGROUND OF THE INVENTION

Modem snowmobiles typically have two skis for supporting the front of the machine and to provide steering and a rubber track for supporting the rear of the machine and to provide traction force. The rider is typically positioned anywhere from directly over the center of the track to over the front of the track, while the engine is located between the drive track and the skis, usually as low as possible.

A snowmobile is considered to be an off-road vehicle and as such it must be able to contend with many different riding environments. The terrain may change from smooth trails to large bumps and jumps. Snow conditions can vary from grippy hard-pack to bottomless powder, from smooth trails to rough and bumpy ones. Accordingly, modem snowmobiles are equipped with long travel suspensions at the front (skis) as well as at the rear (track). The rear track suspension is mounted to the underside of the snowmobile within a tunnel that partially encloses the track and suspension. A seat for the snowmobile rider is provided on top of the tunnel and running boards are provided on either side for supporting the rider's feet.

Existing snowmobile rear suspensions are quite similar. A rubber track is driven from the front by a set of cogged drivers. A set of slide rails enclosed within the track pushes the track onto the ground and provides a sliding surface for the track and mounting points for wheels and suspension arms. There are generally two sets of pivoting suspension arms connecting the rails to the tunnel, one positioned in front of the other at similar angles to form a parallelogram. In most suspensions, both arms are biased downwards with two separate springs. The springs can be arranged in a number of ways to provide various motion ratios (i.e., spring compression versus suspension movement). Each spring is typically controlled by a hydraulic shock absorber to allow the suspension to release bump energy slower than it is absorbed and to prevent undampened oscillation.

A snowmobile's rear suspension must be able to perform the following functions under all conditions: isolate the rider and the machine from the full bump force; maintain track contact with the ground by allowing the rails to articulate to some degree; and, allow the snowmobile to "lean back" upon acceleration to transfer weight to the track.

In most current designs, bump absorption is obtained by using springs and shocks which are mounted in various ways to provide the desired motion ratio. A motion ratio compares spring and shock compression with suspension compression. A falling rate motion ratio is one where the shock speed decreases as the suspension compresses at a constant rate. This results in a soft and comfortable ride, but has poor resistance to bottoming over large bumps and upon landing after being airborne. A rising rate motion ratio is one in which the shock speed increases as the suspension compresses at a constant rate. This setup is typically found in sport snowmobiles and provides excellent control at high speeds and excellent bottoming protection.

Because the off-road environment is often unsmooth, the slide rails must be able to pitch forward and backward to some degree in order to maintain full track contact with the ground. If the arms and rails formed a solid parallelogram, this would not be possible. Instead, this function is typically accomplished by using a solid mounting point for only one of the arms (usually the front arm). The other (back) arm mounts indirectly to the rails using either a third smaller arm or some sort of telescoping device. The amount of rail pitch must be limited to eliminate excessive pitching of the entire machine. This is done in several different ways, usually by limiting the rotation of the third arm or limiting the amount of axial movement of the telescoping device. Once the limit is reached, the suspension is coupled, and the suspension geometry approximates a parallelogram. This forces both arms to compress at the same time. The moment at which a limit is reached is sometimes referred to as the "coupling moment". Most suspensions are coupled in both directions (front to back and back to front), but a few are coupled only in one direction, allowing unrestricted movement of the front arm or of the rear arm.

A snowmobile suspension must also provide weight transfer. Because snow provides limited traction, it is important to put as much of the vehicle weight over the track as possible during acceleration. This is typically accomplished by using the track tension during acceleration to actively pitch the rails, lifting the front of the machine to some degree. Upon acceleration, the top part of the track is in tension. A force analysis performed at the rear axle of the suspension typically shows a major component pushing the rails forward and a minor component pulling the back of the rails upward. The major forward push on the rails is transferred to the front arm where, because of its angle, it pushes the centre of the machine upwards, increasing the downward force on the front of the rails. The minor component pulling up on the back of the rails pulls the rear of the machine downwards, decreasing the downward force on the back of the rails. The result is a snowmobile with less weight on its skis and more on its track.

As mentioned above, in a typical snowmobile riding environment, bumps of all sizes may be encountered. A certain amount of rail pitch is beneficial to allow the track to maintain better contact over the smaller bumps. In some situations, however, the amount of rail pitch must be limited. This is accomplished by several means, usually involving a stopper or a bumper of some sort. The movement of a shorter third arm or a telescoping device is limited by a rubber bumper or a similar device.

When the track suspension encounters a large bump at high speed, first the front arm compresses relative to the underside of the snowmobile. Without any coupling device, the front spring may be overcome by the large bump force and the front arm may bottom harshly. If the two arms become coupled at a certain point, both front and rear arms are forced to move together. This allows the bump to be absorbed by both front and rear springs, effectively increasing the amount of bump energy that can be absorbed using a given set of springs. It is also possible to simply use stronger springs on the front arm, but this results in a harsher ride.

Another scenario in which coupling is desirable is in tail first landings. It is not uncommon for snowmobilers to launch the entire machine into the air, often landing "tail first". In this case, the rear arm in the suspension is prone to rapid bottoming. In this case, coupling also allows the impact to be absorbed by both suspension arms and their respective springs and shocks.

In most suspensions, coupling is provided by a set of bumpers or a by a set of rods that are able to telescope to a certain extent. At the instant when these suspensions couple, the overall spring force is instantly doubled as both suspension arms are forced to move and both springs are engaged. This is characterized by a harsh ride over "chatter bumps" (i.e., small to medium size evenly spaced bumps that force the coupling device to reach both its limits in rapid succession repeatedly). This is far less desirable than gradual coupling and a smooth increase of overall spring force as the suspension compresses.

There are several currently available rear suspension designs for snowmobiles.

U.S. patent application Ser. No. 10/698,980, filed Oct. 31, 2003 by Imamura et al. and published Aug. 19, 2004, includes a quadrilateral linkage system formed between a vehicle body frame, a front torque arm assembly, a rear torque arm assembly, and an extendable member. This suspension uses one coil-over spring to bias both suspension arms. The shock mounts to each arm a certain distance from its pivot so that as the suspension compresses, the shock also compresses. It is a falling rate design with a multi-rate spring that becomes progressively stiffer as it is compressed. The rear arm is mounted to the rails using a short, vertical arm. The device which limits the amount of rail pitch is the lower extendable member linking both arms together. The extendable member comprises a telescoping rod with adjustable limits.

U.S. Pat. No. 6,390,219 filed May 14, 2001 by Vaisanen discloses a snowmobile suspension that provides a substantially constant motion-ratio (i.e. reduced falling rate) over the entire suspension stroke of the suspension system. The suspension system includes a suspension assembly that includes a lower arm assembly, a suspension arm, and a shock absorber. The lower arm assembly pivotally interconnects the lower portion of the suspension arm and the lower end of the shock absorber to the slide frame at a location relative to the chassis and within the endless track. The upper portion of the suspension arm and the upper end of the shock absorber pivot independently from each other, and the upper portion of the suspension arm is positioned lower and forward of the upper end of the shock absorber. The upper end of the shock absorber is positioned relative to the chassis and within the endless track. The mounting positions defined by (i) the upper end of the suspension arm, (ii) the upper end of the shock absorber, (iii) the lower end of the suspension arm, and (iv) the lower end of the shock absorber cooperate to provide a substantially constant motion-ratio as the slide frame collapses toward the frame element. The rear arm is attached to the rails by an "upside down" third vertical arm.

U.S. Pat. No. 6,234,264 filed Nov. 24, 1998 by Boivin, et al. discloses another snowmobile track suspension. The suspension disclosed by Boivin et al. is a long travel design. The front arm is mounted directly to the tunnel and the front shock is mounted in typical fashion. The front arm is mounted to the rails by means of a sliding pivot in a slot. The rear arm is mounted directly to the tunnel and directly to the rails by means of an adjustable pivot that allows for the necessary rail pitch. The rear shock is mounted in similar fashion to the front one.

While there are numerous rear suspension designs, these designs all have several problems and disadvantages.

One problem relates to slide rail pitching. During acceleration, various suspension forces result in less pressure on the skis. In the foregoing prior art designs, the arrangement of the suspension arms has an unstable geometry. Once the rails begin to pitch (either forward or backward), there is a decreasing amount of resistance to further pitch. The result is that once the rails begin to pitch upon acceleration, they tend to continue to do so until they reach a limit at full transfer at which point the skis are not in contact with the ground. Once the skis begin to lift, they tend to "snap up", only coming down once the amount of acceleration (throttle opening) decreases by a large amount. While a controllable amount of ski lift is desirable, too much of it results in poor steering and cornering characteristics. Ideally, a rider should be able to control weight transfer more with his body movement than throttle opening.

Another problem exists in designs using a third vertical arm, such as that disclosed by Imamura. As the rail begins to pitch the angle of the third arm changes. A force analysis typically reveals that further pitch becomes progressively easier until a hard limit is reached. This characteristic encourages rapid back and forth pitching within the predetermined limits.

Yet another problem relates to the spring and shock motion ratio. This ratio describes the compression of the shock and/or spring in relation to the upward movement of the suspension rails. As mentioned above, there are three general variations: falling rate, linear, and rising rate. A falling rate suspension has a shock/spring ratio that falls as the suspension is compressed. This causes the suspension to feel softer over large bumps, but can easily bottom out the suspension with large input forces. When a suspension bottoms out, a large "jolt" is fed into the chassis. The result is rider discomfort, potential loss of control, and very high stress levels on suspension components. A rising rate suspension gets more firm as the suspension compresses. This provides excellent bottoming resistance but also results in a firm (bumpy) ride over certain bumps. A constant ratio suspension falls in the middle of the other two, combing some traits of each.

Ideally, a suspension should combine the comfort of a falling rate design with the ability to handle large bumps of a rising rate design. Much effort has been made to this effect. Falling rate suspensions are fitted with multiple springs with different rates in an effort to prevent bottoming. Many shocks are designed so that there is no effective dampening in mid-stroke to allow more comfort over small, rapid stutter bumps. While somewhat effective, these approaches involve compromise between comfort and control.

A need therefore exists for an improved snowmobile rear suspension. Consequently, it is an object of the present invention to obviate or mitigate at least some of the above mentioned disadvantages.

SUMMARY OF THE INVENTION

According to the present invention, there is provided a track suspension for a snowmobile comprising: a rear arm having an upper end pivotally attachable to an underside of the snowmobile at an upper rear arm pivot, a rear arm crank extending from the rear arm at the upper end thereof, the rear arm having a lower end pivotally connected to a slide rail at a rear slide rail pivot; a front arm having an upper end pivotally attachable to the underside of the snowmobile at an upper front arm pivot, a front arm crank extending from the front arm at the upper end thereof; a front linkage having an anterior end pivotally connected to the front arm crank and having a posterior end pivotally attached to the rear arm crank at a posterior linkage pivot; and, a resilient element having an anterior end pivotally attached to the front linkage, the resilient element operable to resist pivoting movement of the rear arm about the upper rear arm pivot in response to movement of the rear slide rail pivot towards the underside of the snowmobile.

The front linkage may be pivotally connected to the front arm crank by means of a front rocker. The front rocker may be pivotally attached to the front arm crank at a front rocker pivot and pivotally attached to the front linkage at an anterior linkage pivot. The anterior linkage pivot may be rearward of the front rocker pivot.

The resilient element may comprise a fluid filled shock absorber in combination with a co-axially mounted coil spring. Persons skilled in the art will recognize that other types of resilient elements can be provided to achieve a similar effect. The resilient element may have a posterior end pivotally attached to an upper end of a rear rocker having a lower end that is pivotally attached to a rear linkage at a rear linkage pivot. The rear rocker may be pivotally attached to the rear arm at a rear rocker pivot located between the upper and lower ends of the rear rocker. A lower end of the front arm may be pivotally attached to the rear linkage. The front arm may have an outwardly extending dog between its upper and lower ends that is pivotally attached to a lower end of a rail rocker having an upper end pivotally attached to the slide rail at a front slide rail pivot. In this case, the lower end of the rear arm may be connected to the slide rail by direct attachment to the rear slide rail pivot. Alternatively, the front arm may be pivotally attached to the slide rail at the front slide rail pivot at a location between the upper and lower ends of the front arm. The lower end of the rear arm may then be connected to the slide rail by means of an upright rocker having an upper end pivotally attached to the lower end of the rear arm and having a lower end pivotally attached to the slide rail at the rear slide rail pivot.

In operation, compression of the rear slide pivot towards the underside of the snowmobile causes the rear arm to rotate about the upper rear arm pivot, thereby causing the rear arm crank to pull upon the front linkage against the bias of the resilient element connected thereto. This action in turn causes the front rocker to pull at substantially a right angle to the front arm crank, thereby causing a rotation of the front arm in a direction corresponding to the rotation of the rear arm. This rotation is resisted by the rear linkage, which pushes against the rear rocker and thereby further compresses the resilient element from the posterior thereof.

The suspension of the present invention advantageously permits dampening of both the front and rear suspension arms using a single resilient element while still providing the desired balance between ride cushioning and performance characteristics. The suspension provides the desired degree of rider weight and balance control during acceleration without excessive rail pitching while at the same time providing a smooth ride over chatter bumps without bottoming out during tail-first landings. The suspension advantageously exhibits a U-shaped motion ratio profile during compression. In other words, the suspension combines the advantages of falling rate, constant rate and rising rate designs during various stages of compression to provide the desired ride and handling characteristics.

BRIEF DESCRIPTION OF THE DRAWINGS

Having summarized the invention, preferred embodiments thereof will now be described with reference to the accompanying figures, in which.

DETAILED DESCRIPTION OF PREFERRED EMBODIMENTS

Figure 1:
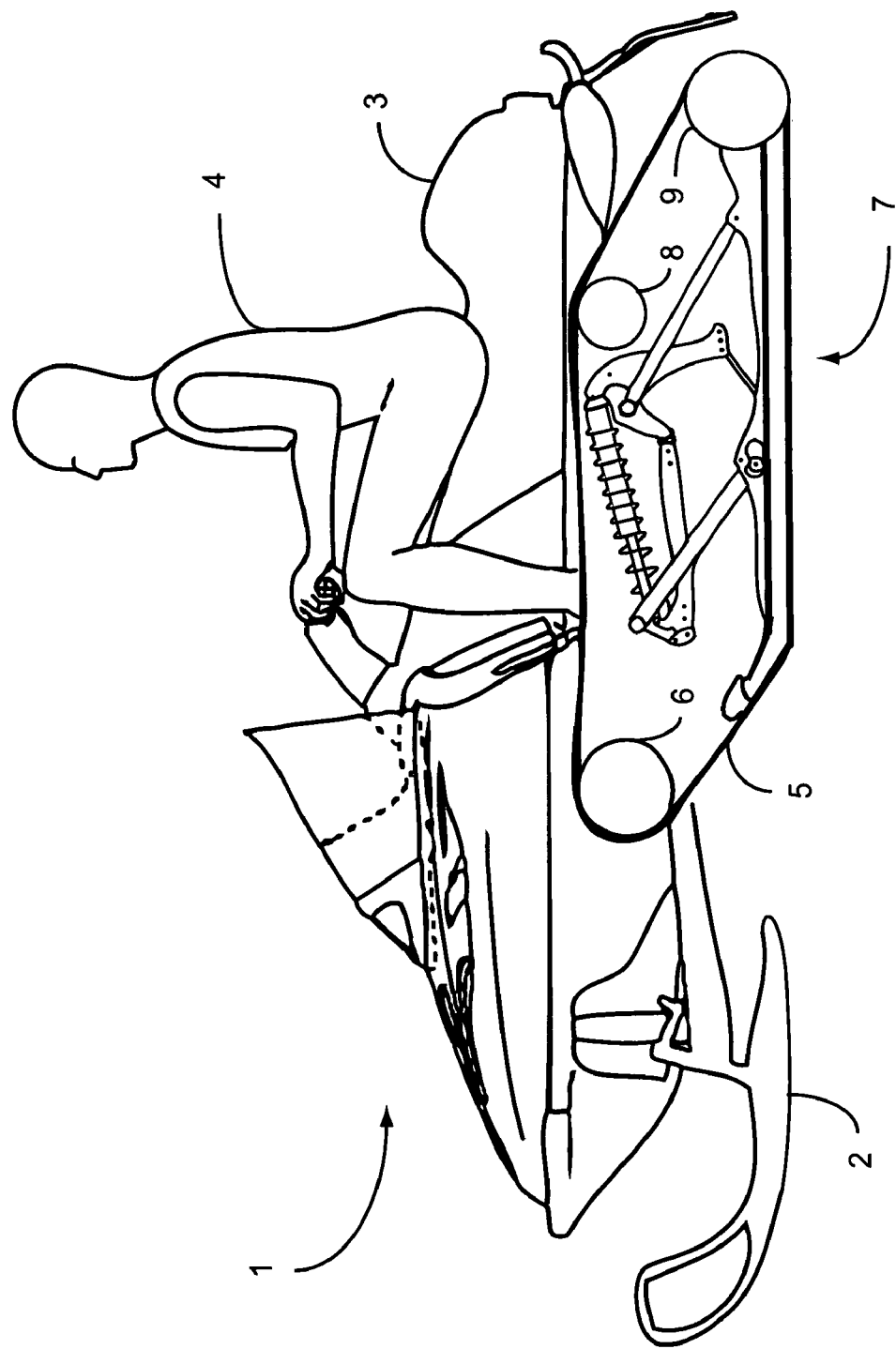
FIG. 1 is a side view of a snowmobile having a track suspension of the present invention mounted thereto.

Referring to FIG. 1, a snowmobile 1 is shown generally with a pair of front skis 2, a seat 3 for supporting a rider 4 and a rear track 5. The rear track 5 is driven by a front drive pulley 6 and supported by a track suspension 7 according to the present invention. The track suspension 7 is mounted to the underside of the snowmobile 1 beneath the seat 3 within a tunnel that partially encloses the track 5, drive pulley 6 and suspension 7. A pair of running boards (which have been omitted to better show the invention) for supporting the rider's feet are provided on either side of the tunnel. The drive pulley 6 shown in FIG. 1 rotates in a counterclockwise direction. During throttle-induced acceleration of the snowmobile 1, the tension of the track 5 increases between the drive pulley 6, upper idler 8 and lower idler 9. The increased track tension causes the suspension to compress, particularly at the rear, and the lower idler 9 to move toward the underside of the snowmobile. This in turn causes the skis 2 to pitch upwardly, reducing frictional drag at the front of the snowmobile 1 and desirably increasing the rate of acceleration of the snowmobile 1.

Figure 2:
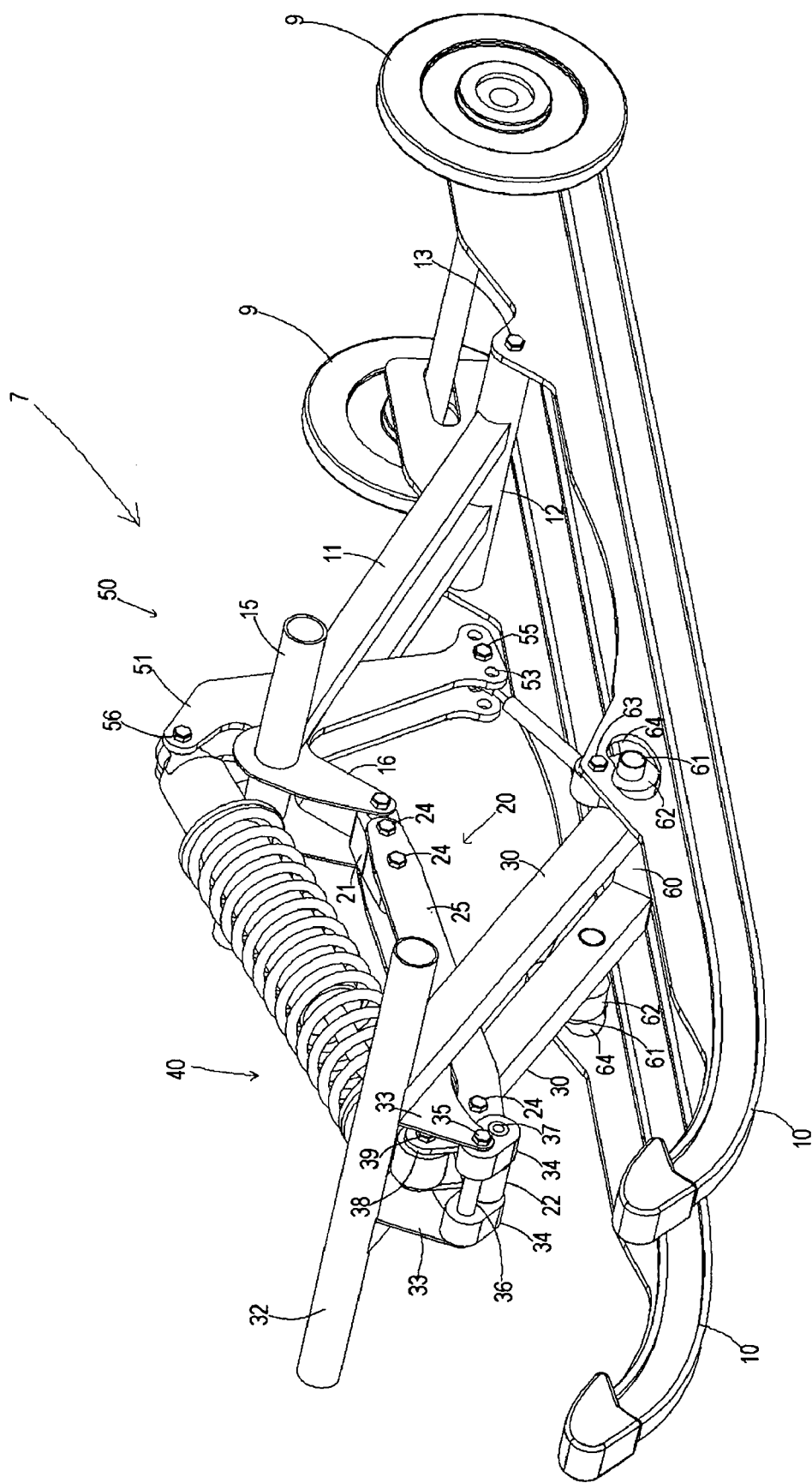
FIG. 2 is a perspective view of the track suspension.
Figure 3:
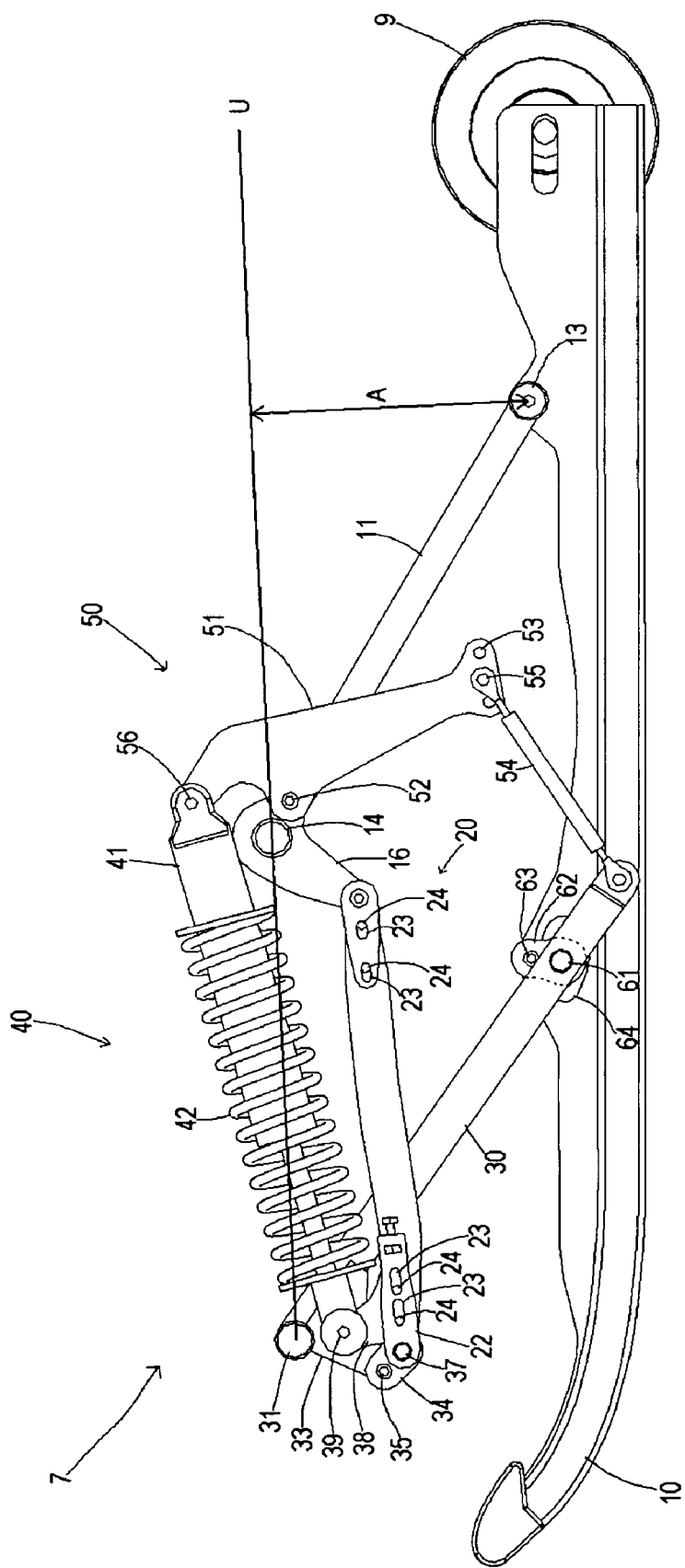
FIG. 3 is a side cross-sectional view of the track suspension while traveling over a level surface.

The various components of the track suspension 7 will now be further described with reference to FIGS. 2-4. A pair of slide rails 10 is provided on the underside of the suspension 7 and the track 5 (not shown in FIGS. 2-4) passes under the slide rail 10 and over the lower idlers 9 at the rear of the suspension. The suspension 7 comprises a pair of rear arms 11, each rear arm 11 having an upper end and a lower end. The lower end of each rear arm 11 is attached to a lower rear pivot shaft 12, which in turn connects the lower ends to the slide rails 11 at a rear slide rail pivot 13. The underside of the snowmobile is represented by the dashed line U and the distance between the rear slide rail pivot 13 and U is represented by A. The upper end of each rear arm 11 is pivotally attached to the underside of the snowmobile at an upper rear arm pivot 14 by means of an upper rear pivot axle 15. A rear arm crank 16 extends forwardly and downwardly from the upper end of each rear arm 11 and is pivotally attached to the posterior end of a front linkage 20. The front linkage 20 is adjustable in length and comprises a rear linkage extension 21 and a front linkage extension 22 provided for that purpose. Each linkage extension 21, 22 comprises a pair of slotted holes 23 and the position of each linkage extension is adjustable by sliding movement relative to connecting bolts 24 passing through the slotted holes 24 and securing a pair of opposed side plates 25 to either side of each linkage extension.

The suspension 7 further comprises a pair of front arms 30, each having an upper end and a lower end. The upper end of each front arm 30 is pivotally attached to the underside of the snowmobile at an upper front arm pivot 31 by means of an upper front pivot axle 32. A front arm crank 33 extends forwardly and downwardly from each front arm 30. The anterior end of the front linkage 20 is pivotally connected to each front arm crank 33 by means of a pair of front rockers 34 each having an upper end that is pivotally attached to its respective front arm crank 33 at a rocker pivot 35. The rocker pivot 35 of each front rocker 34 is also connected to a front rocker shaft 36 located between the front rockers 34. The lower end of each front rocker 34 is pivotally attached to the front linkage extension 22 of the front linkage 20 at an anterior linkage pivot 37 that is below the rocker pivot 35. A front linkage portion 38 extends upwardly from each side plate 25 of the front linkage 20. Each front linkage portion 38 is located between the anterior and posterior ends of the front linkage 20 and is pivotally attached to a resilient element 40 at a shock pivot 39.

The resilient element 40 comprises a fluid-filled shock 41 and a co-axial externally mounted coil spring 42. The shock 41 and spring 42 co-operate to provide a bias against both the anterior and posterior ends of the resilient element 40 while at the same time dampening suspension oscillation. Both the amount of bias and degree of dampening can be adjusted through manipulation of the spring 41 and shock 42, respectively. The anterior end of the resilient element 40 is lower than the posterior end and, as a result, a component of the bias is directly downwardly on to the anterior end of the front linkage 16. This urges the anterior linkage pivot 37 to rotate about the rocker pivot 35 in response to movement of the suspension 7 and thereby changes the angle between the front rocker 34 and the front arm crank 33 in a manner as will be more thoroughly described hereinafter.

Although during normal operation the length of the front linkage 20 is fixed, it can also be adjusted by the rider to select a desired set of suspension dynamics in response to either riding conditions or performance objectives. Adjustment of the length of the front linkage 20 can be effected from either end thereof. Adjustment of the length from the posterior end can be used to select a desired angle between the front linkage 20 and the rear arm cranks 16. Adjustment of the length from the anterior end can be used to select a desired angle between the front rockers 34 and the front arm cranks 33. Both ends of the linkage may be adjusted at the same time or they may be adjusted separately. Adjustment of the length of the front linkage 20 may also be used to select a desired downward angle of the resilient element 40, thereby effecting the amount of downward bias provided to the anterior linkage pivot 37.

The posterior end of the resilient element 34 is pivotally attached to the upper end of a rear rocker 50 at a posterior shock pivot 56. The rear rocker 50 comprises a pair of opposed rear rocker plates 51 located to either side of the posterior end of the resilient element 40. Each rear rocker plate 51 is pivotally attached to its respective rear arm 11 at a rear rocker pivot 52 located rearward of the upper rear arm pivot 14 and between the upper and lower ends of the rear rocker 50. The lower end of the rear rocker 50 comprises a plurality of spaced apart adjustment holes 53 located in each rear rocker plate 51. A rear linkage 54 has an upper end that is pivotally attached to the rear rocker 50 at a rear linkage pivot 55 passing through a selected pair of adjustment holes 53. By selecting a different pair of adjustment holes 53 for the location of the rear linkage pivot 55, the angle between the rear linkage 54 and the rear rocker 50 can be adjusted, thereby changing the moment angle and the amount of downward bias provided to the rear linkage 54 from the posterior end of the resilient element 40.

The rear linkage 54 has a lower end that is pivotally attached to a lower front arm connecting plate 60 that is fixedly attached to the lower end of each front arm 30. Between the upper and lower ends of each front arm 30 is provided an outwardly extending dog 61 that is pivotally attached to the lower end of a rail rocker 62. The upper end of each rail rocker 62 is pivotally attached to its respective slide rail 10 at a front slide rail pivot 63. The dog 61 is permitted to orbit arcuately about the front slide rail pivot 63 between first and second pitching constraints and extends through a substantially U-shaped slot 64 in the side rail 10. The first and second pitching constraints roughly correspond to the ends of the slot, although the dog 61 need not necessarily engage the ends of the slot 64 to encounter the pitching constraints. Preferably, the pitching constraints are encountered in a gradual manner due to a progressively increasing force provided by the resilient member 40 as the dog 61 approaches each end of the slot 64. This preferred gradual approach to the first and second pitching constraints results in a much smoother ride than is provided in prior art suspensions that rely upon "hard coupling", or physical interaction between parts at pre-determined motion limits.

The rear linkage 54 is adjustable in length and comprises a threaded turnbuckle. Adjustment of the length of the rear linkage 54 can be used to change its angle with respect to the front arms 30 and to thereby pre-set a desired height of the rear of the snowmobile. Adjustment of the rear linkage 54 can be made to accommodate selection of a different pair of adjustment holes 53.

Figure 5:
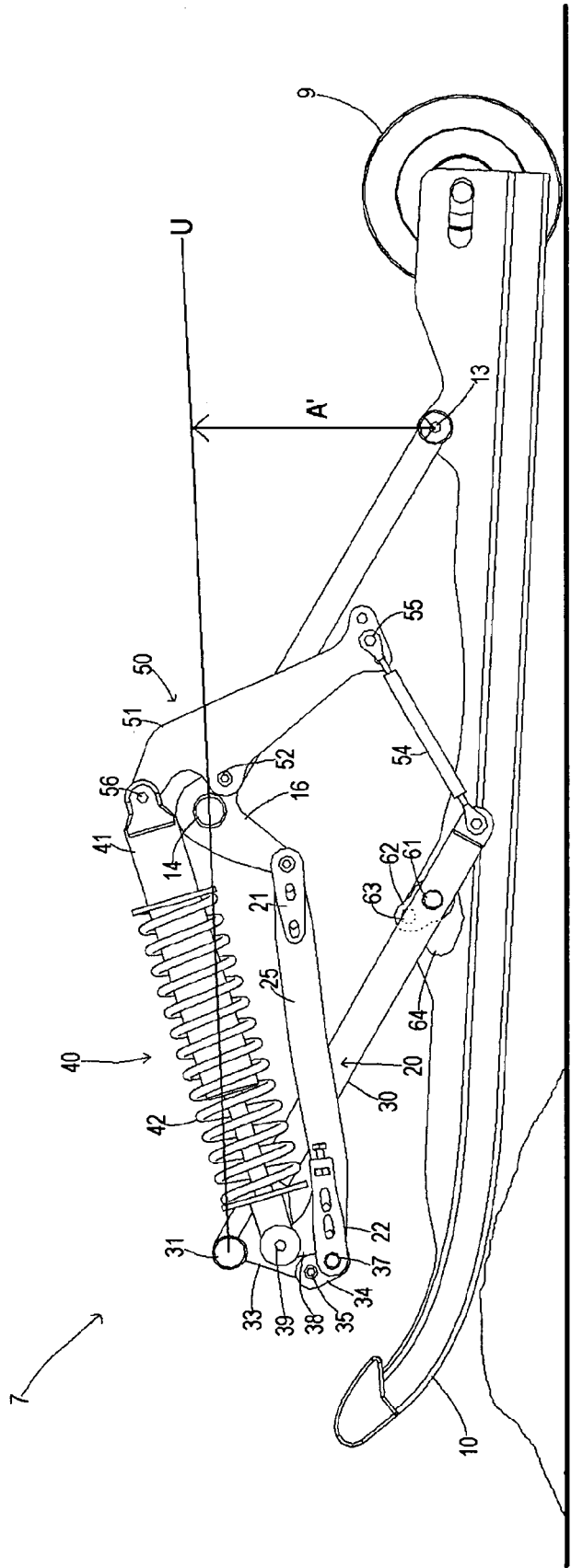
FIG. 5 is a side cross-sectional view of the track suspension with front arm compression, for example when the snowmobile first encounters a terrain obstacle.
Figure 6:
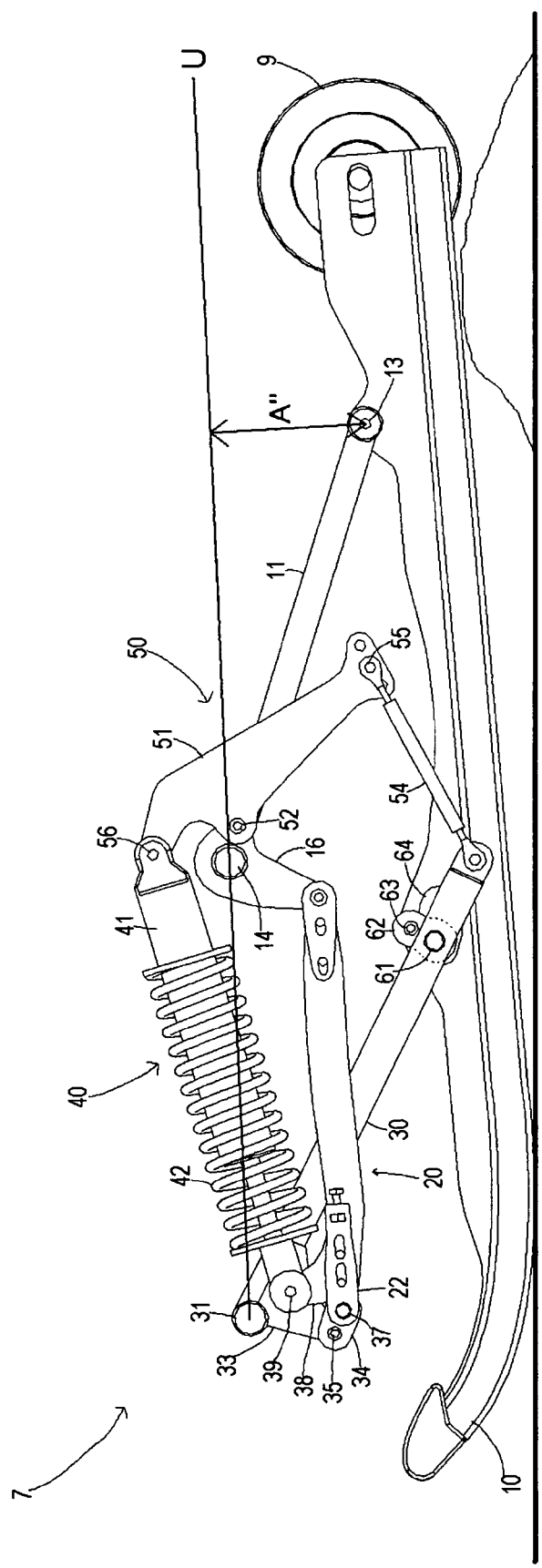
FIG. 6 is a side cross-sectional view of the track suspension with rear arm compression, for example when the snowmobile is leaving a terrain obstacle.

Referring to FIGS. 5 and 6, the pitching action of the suspension in response to a terrain obstacle will now be discussed.

Turning specifically to FIG. 5, when a terrain obstacle is first encountered by the track, the front part of the slide rails 10 pitch upwardly to move over the obstacle and the front slide rail pivot 63 moves towards the underside of the snowmobile. This causes the dog 61 to move rearwardly in relation to the slot 64 as it rotates about front slide rail pivot 63 and approaches the first pitching constraint. The lower end of the front arm 30 then pushes against the rear linkage 54, thereby causing the rear rocker 50 to rotate counter-clockwise about the rear rocker pivot 52 and compressing the posterior end of the resilient element 40. As the front of the slide rail 10 moves upwardly, the rear of the slide rail moves downwardly relative to the underside of the snowmobile, as represented by dashed line U. This in turn causes the distance between the rear slide rail pivot 13 and the underside of the snowmobile U, as represented by A', to increase. Much of the counter-clockwise rotational movement of the front arm 30 about the upper front arm pivot 31 is absorbed by the arcuate movement of the dog 61 about the front slide rail pivot 63 and by clockwise rotational movement of the front rocker 34 about the front rocker pivot 35. As the first pitching constraint is approached, the front rocker 34 is nearly perpendicular to the front linkage 20 and rotational movement of the front arm 30 pushes mostly downwardly on the front linkage, which causes very little compression of the resilient element 40. Contemporaneously, the rail rocker 62 approaches being parallel with the front arm 30. By virtue of the selected geometry, further upward pitching of the slide rails 10 causes a strong rearward force component to be applied to the slide rails and a corresponding tendency for the rear arm 11 to rotate counter-clockwise about the upper rear arm pivot 14. The distance A' therefore approaches a maximum as the first pitching constraint is approached. Further pitching of the rails beyond the first pitching constraint results in suspension compression as the distance A' decreases. The front of the slide rails 10 are therefore permitted to pitch within a window described by the difference between A and A' before gradually approaching a first pitching constraint beyond which the transition to suspension compression begins.

Turning now to FIG. 6, as the terrain obstacle passes to the rear of the suspension 7, the rear slide rail pivot 13 moves upwardly towards the underside U and the distance A" decreases. This causes the rear arm 11 to rotate counter-clockwise about the upper rear arm pivot 14, causing the rear arm crank 16 to pull upon the front linkage 20. This causes the front rocker 34 to be drawn from a position that is substantially perpendicular to the front linkage 20 (as shown in FIG. 5) to a position that approaches being parallel with the front linkage 20. Contemporaneously, the dog 61 orbits clockwise about the front slide rail pivot 63 and moves forward toward the front of the slot 64. Relatively little compression of the resilient element 40 occurs as the front rocker 34 changes position. However, as the front rocker 34 approaches the parallel position and the dog 61 approaches the second pitching constraint, further rotation of the rear arm 11 causes the linkage to pull strongly on the spring and causes the front rocker to act strongly on the front arm crank 33. The suspension then begins to compresses and both the front and rear arms 30, 11 begin to move. The rear of the slide rails 10 are therefore permitted to pitch within a window described by the difference between A and A" before gradually approaching a second pitching constraint beyond which the transition to suspension compression begins.

During compression of the rear of the slide rails beyond the second motion constraint, such as is encountered during a tail first landing, the counter-clockwise rotation of the rear arm 11 causes the rear arm crank 16 to pull strongly against the anterior end of the resilient element 40 by means of the front linkage 20. The front rocker 34 is nearly parallel to the front linkage 20, so further compression of the rear arm 11 causes the front rocker 34 to pull strongly on the front arm crank 33, forcing the front arm 30 to rotate counter-clockwise. This action causes the front arm 30 to push strongly against the rear linkage 54 and ultimately the posterior end of the resilient element 40 through the rear rocker 50. This bolsters compression of the resilient element 40 by the rotational action of the rear arm 11 and causes both arms to contribute in resisting further rear suspension compression. This co-operative action is particularly useful in preventing "bottoming out" of the suspension upon a tail-first landing.

Figure 4A:
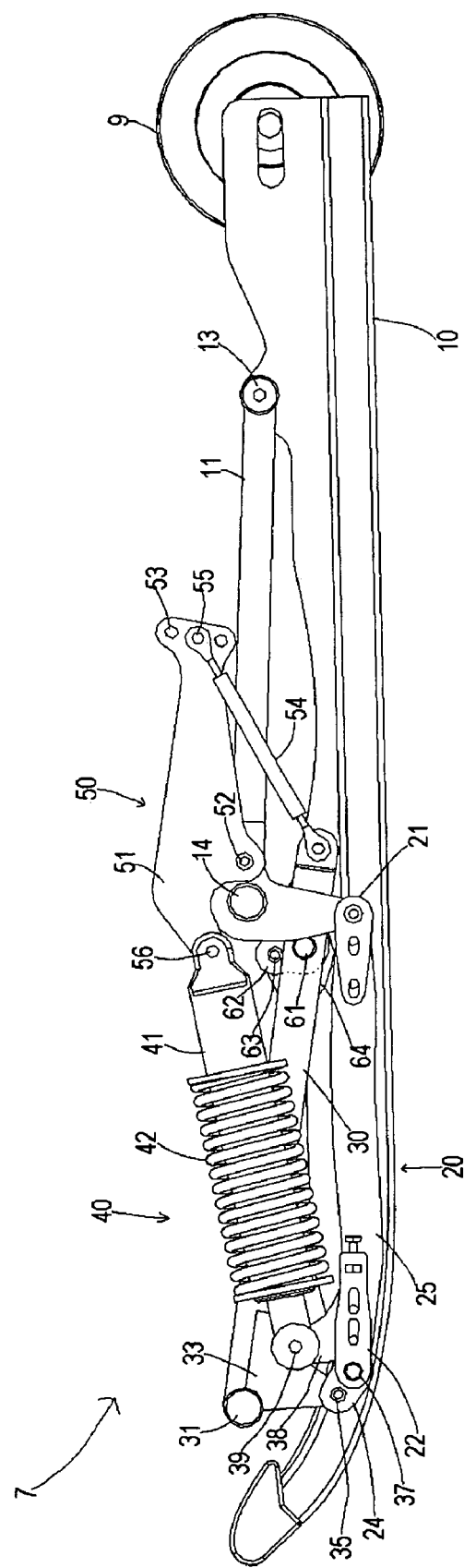
FIG. 4a is a side cross-sectional view of the track suspension during full compression.
Figure 4B:
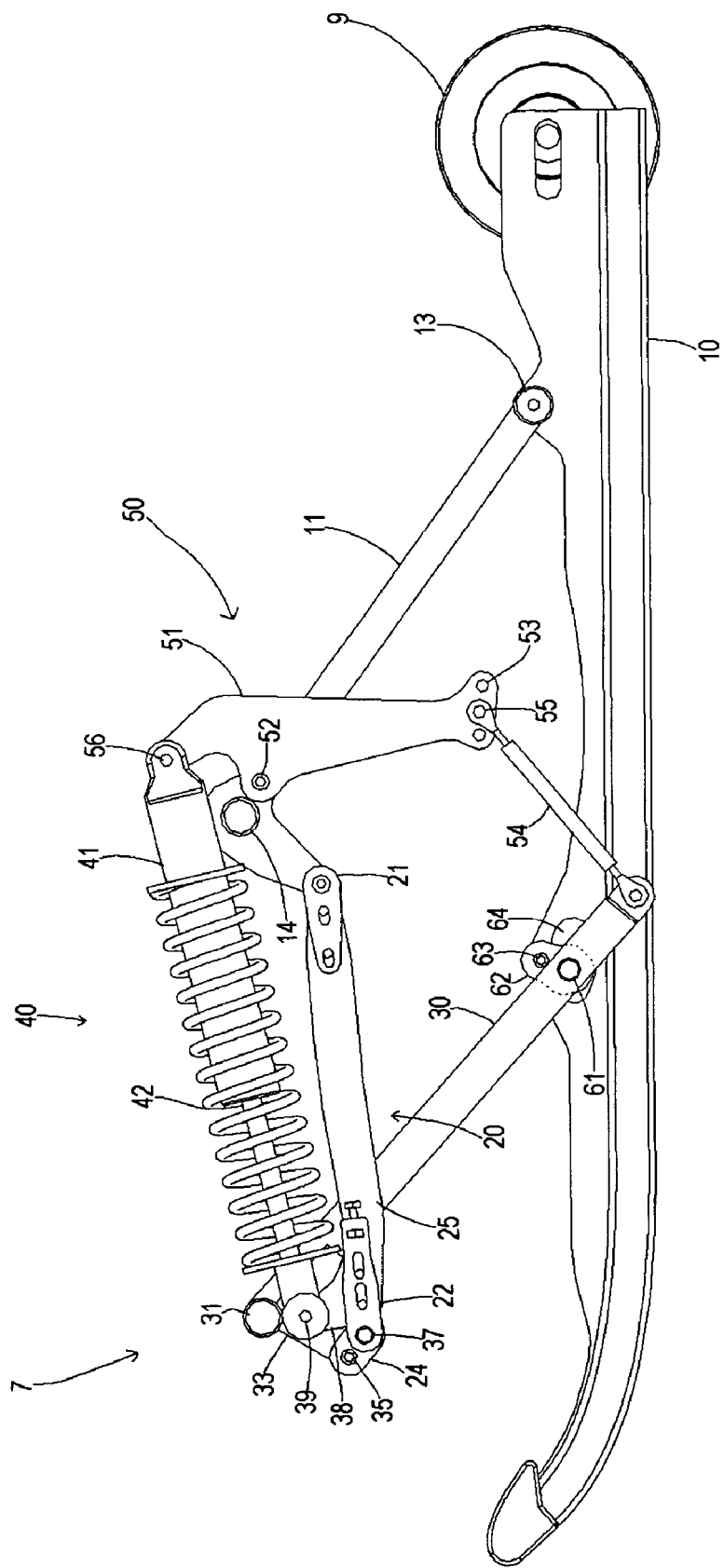
FIG. 4b is a side cross-sectional view of the track suspension during full extension.
Figure 7:
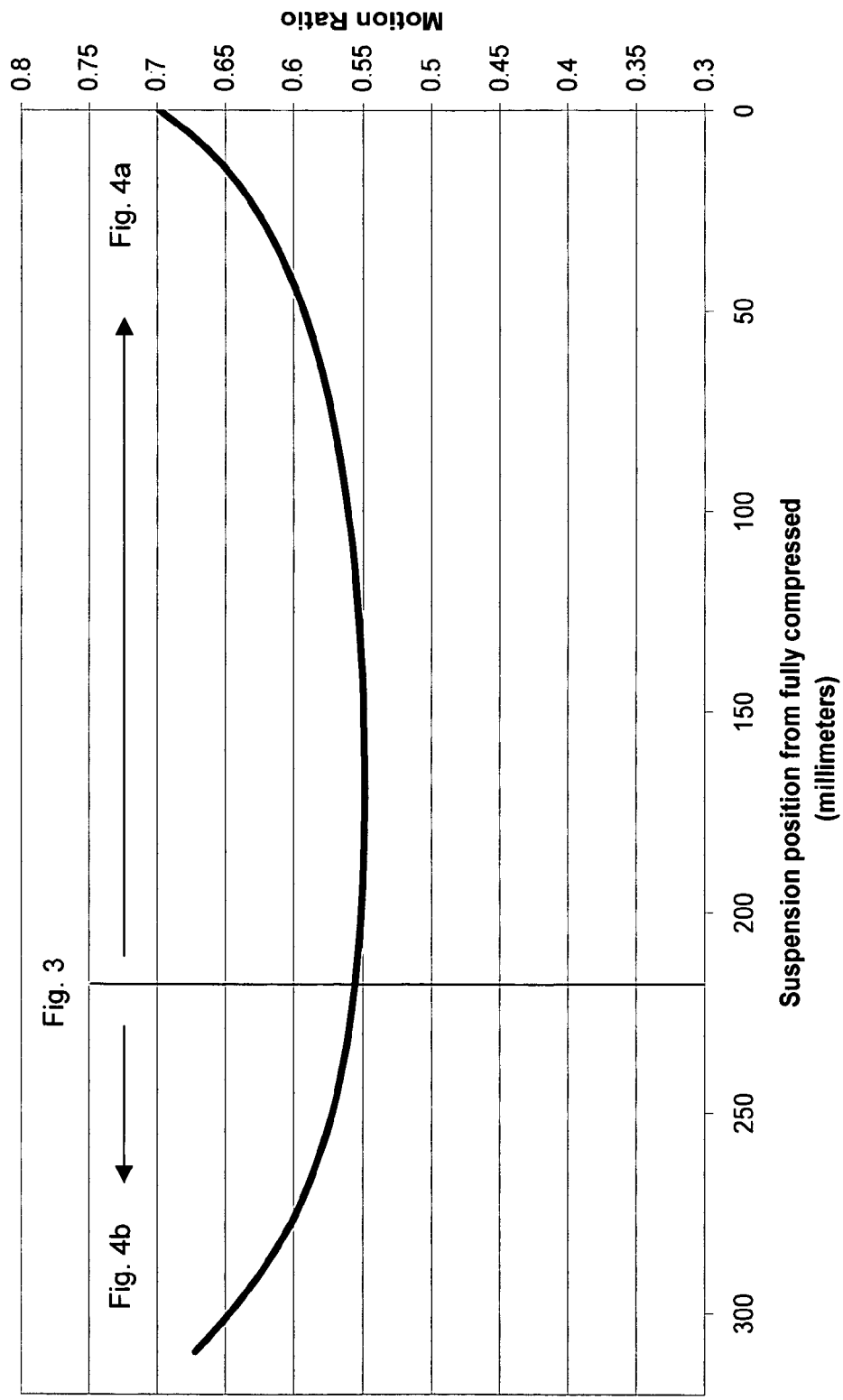
FIG. 7 is a plot of motion ratio vs. suspension compression for the track suspension with a selected set of linkage length adjustments and spring compressions; and, FIG. 8 is a side cross-sectional view of another track suspension according to the present invention.

Returning now to FIGS. 4a and 4b and referring additionally to FIG. 7, the shock speed and motion ratio during various phases of suspension compression is illustrated. Data was obtained by modeling motion ratio as a function of the distance between the rear slide rail pivot 13 and the underside of the snowmobile U, with 0 mm representing full compression (as shown in FIG. 4a) and 320 mm representing full extension (as shown in FIG. 4b). Starting from the vertical line representing the normal riding position shown in FIG. 3 (i.e. normal suspension compression of about 100 mm while traveling over level terrain), when a jump is made and the snowmobile becomes airborne the suspension begins to extend and we travel along the ordinate axis left of the vertical line. The motion ratio increases and the suspension therefore exhibits a rising rate behaviour. Upon landing, the suspension compresses and exhibits an initial falling rate behaviour where shock speed is resisted by progressively less force. This provides a cushioned landing. Once the suspension is somewhat compressed we move along the ordinate axis right of the vertical line and the motion ratio is constant rate. As the suspension becomes significantly compressed it begins to exhibit a rising rate behaviour. The exponential increase in force as full compression is approached is particularly useful in preventing "bottoming out" of the suspension during landing.

Referring again to FIG. 1, throttle-induced acceleration of the snowmobile 1 causes the tension of the track 5 to increase, resulting in suspension compression that moves the lower idler 9 towards the underside of the snowmobile and causes the skis 2 to pitch upwardly. Although upward pitching of the skis 2 desirably results in increased acceleration due to reduced frictional drag, too much pitching causes "twitchy" performance under throttle and a potential loss of steering control during acceleration. It is therefore further desirable to limit ski pitch during acceleration, preferably in a gradual manner to prevent jarring movements as are encountered in prior art suspensions due to physical interaction between parts and in order to provide sufficient feedback to the driver when approaching excessive throttle-induced ski pitch. The gradual approach to the second pitching constraint provided by the present invention advantageously provides this gradual feedback. Upon further acceleration past the second pitching constraint the suspension compresses toward the underside of the snowmobile, particularly at the rear, and the suspension moves rightward from the vertical line through the constant rate region and into the rising rate region. The rising rate region provides a rapidly increasing resistance to further compression of the suspension, further acting to gradually limit ski pitch.

Figure 8:
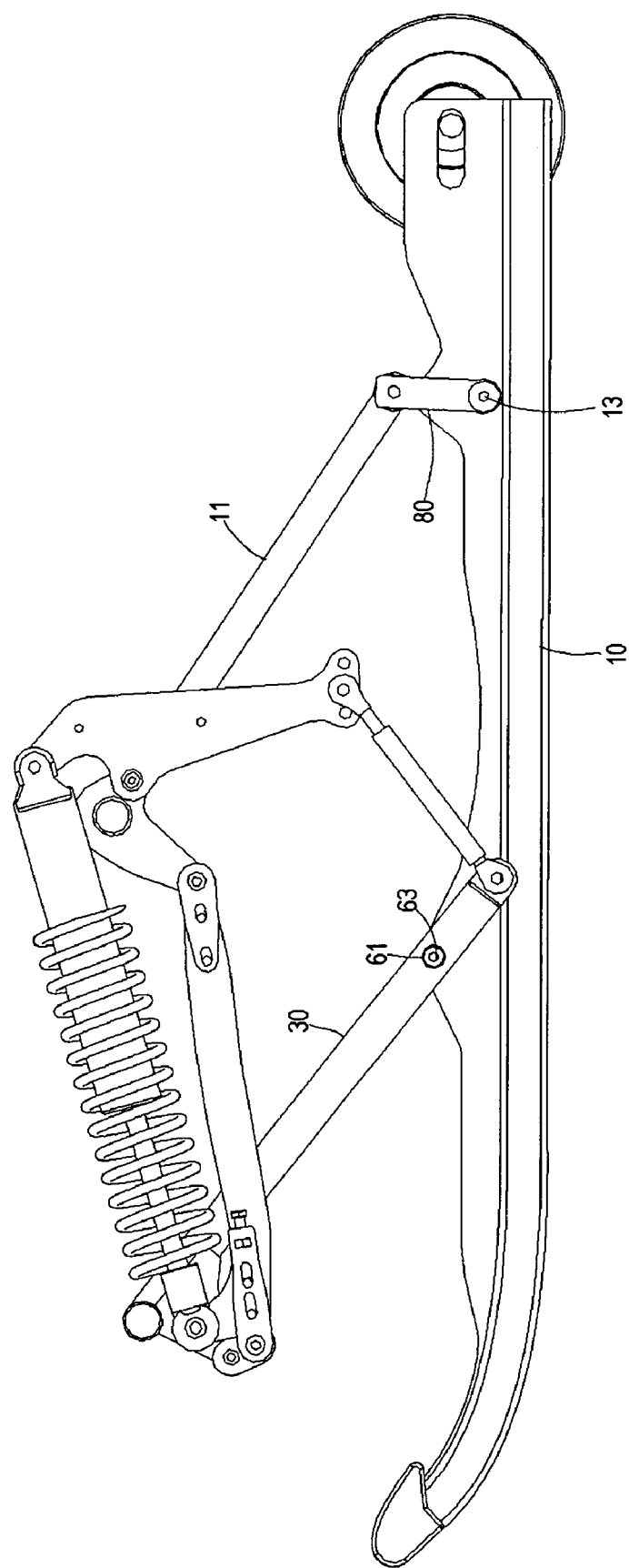

Referring to FIG. 8, an alternative embodiment of the invention is shown. In this embodiment, like numerals will be used to describe like features to those in the previously described embodiment. The rear arms 11 are pivotally connected to the rear slide rail pivot 13 by means of an upright rocker 80 having an upper end attached to the lower rear pivot shaft (not shown in FIG. 8), which is in turn attached to the lower end of the rear arms 11. The lower end of each upright rocker 80 is pivotally attached to its respective slide rail 10 at the rear slide rail pivot 13. In this embodiment, the dog 61 of each front arm 30 is pivotally attached directly to the front slide rail pivot 63, obviating the need for the rail rocker. This embodiment functions in most respects similar to the previously described embodiment with the potential for certain manufacturing and maintenance advantages.

The front and rear linkages are described as being adjustable in length to permit adjustment of the suspension 7 by the rider for a preferred riding style or in response to riding conditions. The invention functions equally well without this adjustability and the variable length linkages may be replaced by fixed length linkages.

The foregoing describes preferred embodiments of the invention and other features and embodiments of the invention will be evident to persons skilled in the art. The following claims are to be construed broadly with reference to the foregoing and are intended by the inventor to include other variations and sub-combinations that are not explicitly claimed.

The invention claimed is:

1. A track suspension for a snowmobile comprising:
   a) a rear arm having an upper end pivotally attachable to an underside of the snowmobile at an upper rear arm pivot, a rear arm crank extending from the rear arm at the upper end thereof, the rear arm having a lower end pivotally connected to a slide rail at a rear slide rail pivot;
   b) a front arm having an upper end pivotally attachable to the underside of the snowmobile at an upper front arm pivot, a front arm crank extending from the front arm at the upper end thereof;
   c) a front linkage having an anterior end pivotally connected to the front arm crank and having a posterior end pivotally attached to the rear arm crank at a posterior linkage pivot; and,
   d) a resilient element having an anterior end pivotally attached to the front linkage, the resilient element operable to resist pivoting movement of the rear arm about the upper rear arm pivot in response to movement of the rear slide rail pivot towards the underside of the snowmobile.

2. A track suspension for a snowmobile comprising:
   a) a rear arm having an upper end pivotally attachable to an underside of the snowmobile at an upper rear arm pivot, a rear arm crank extending from the rear arm at the upper end thereof, the rear arm having a lower end pivotally connected to a slide rail at a rear slide rail pivot;
   b) a front arm having an upper end pivotally attachable to the underside of the snowmobile at an upper front arm pivot, a front arm crank extending from the front arm at the upper end thereof;
   c) a front linkage having an anterior end pivotally connected to the front arm crank and having a posterior end pivotally attached to the rear arm crank at a posterior linkage pivot;
   d) a resilient element having an anterior end pivotally attached to the front linkage, the resilient element orerable to resist pivoting movement of the rear arm about the upper rear arm pivot in response to movement of the rear slide rail pivot towards the underside of the snowmobile; and,
   e) wherein the front linkage is pivotally connected to the front arm crank by means of a front rocker pivotally attached to the front arm crank at a front rocker pivot and pivotally attached to the anterior end of the front linkage at an anterior linkage pivot.

3. The suspension according to claim 1, wherein the resilient element is angled downwardly toward the front linkage.

4. The suspension according to claim 1, wherein the front arm crank extends downwardly from the front arm and wherein the rear arm crank extends downwardly from the rear arm.

5. A track suspension for a snowmobile comprising:
   a) a rear arm having an upper end pivotally attachable to an underside of the snowmobile at an upper rear arm pivot, a rear arm crank extending from the rear arm at the upper end thereof, the rear arm having a lower end pivotally connected to a slide rail at a rear slide rail pivot;
   b) a front arm having an upper end pivotally attachable to the underside of the snowmobile at an upper front arm pivot, a front arm crank extending from the front arm at the upper end thereof;
   c) a front linkage having an anterior end pivotally connected to the front arm crank and having a posterior end pivotally attached to the rear arm crank at a posterior linkage pivot;
   d) a resilient element having an anterior end pivotally attached to the front linkage, the resilient element orerable to resist pivoting movement of the rear arm about the upper rear arm pivot in response to movement of the rear slide rail pivot towards the underside of the snowmobile; and,
   e) wherein the front linkage has an upwardly extending portion and wherein the resilient element is attached to the front linkage at the upwardly extending portion.

6. The suspension according to claim 2, wherein the anterior linkage pivot is below the front rocker pivot.

7. The suspension according to claim 1, wherein the front linkage has an adjustable length.

8. The suspension according to claim 7, wherein adjustment of the length of the front linkage affects the amount of resistance of the resilient element to pivoting movement of the rear arm about the upper rear arm pivot.

9. The suspension according to claim 2, wherein the resilient element has a posterior end pivotally attached to an upper end of a rear rocker having a lower end that is pivotally attached to a rear linkage at a rear linkage pivot, the rear rocker pivotally attached to the rear arm at a rear rocker pivot located between the upper and lower ends of the rear rocker.

10. The suspension according to claim 9, wherein the location of the rear linkage pivot on the rear rocker is adjustable.

11. The suspension according to claim 9, wherein the rear linkage has an adjustable length.

12. The suspension according to claim 9, wherein the front arm has a lower end that is pivotally attached to the rear linkage.

13. The suspension according to claim 12, wherein the front arm has an outwardly extending dog between its upper and lower ends that is pivotally attached to a lower end of a rail rocker having an upper end pivotally attached to the slide rail at a front slide rail pivot.

14. The suspension according to claim 13, wherein the dog moves arcuately about the slide rail pivot between first and second pitching constraints.

15. The suspension according to claim 14, wherein the dog approaches the first pitching constraint in response to movement of the rear slide rail pivot away from the underside of the snowmobile.

16. The suspension according to claim 15, wherein the rail rocker approaches being parallel with the front arm.

17. The suspension according to claim 14, wherein the dog approaches the second pitching constraint in response to movement of the rear slide rail pivot towards the underside of the snowmobile.

18. The suspension according to claim 17, wherein the front rocker approaches being parallel with the front linkage.

19. The suspension according to claim 1, wherein the lower end of the rear arm is pivotally connected to the rear slide rail pivot by means of an upright rocker having an upper end pivotally attached to the lower end of the rear arm and having a lower end pivotally attached to the slide rail at the rear slide rail pivot.

20. The suspension according to claim 12, wherein the front arm is pivotally attached to the slide rail at a front slide rail pivot located between the upper and lower ends of the front arm.

* * * * *

UNITED STATES PATENT AND TRADEMARK OFFICE
CERTIFICATE OF CORRECTION

PATENT NO.        : 7,395,890 B2                                Page 1 of 1
APPLICATION NO.   : 11/329281
DATED             : July 8, 2008
INVENTOR(S)       : Visscher It is certified that error appears in the above-identified patent and that said Letters Patent is hereby corrected as shown below:

Claim 2 d), column 11, line 41: "orerable" should read -- operable -- as shown below.
    d) a resilient element having an anterior end pivotally attached to the front linkage, the resilient element "~~orerable~~" operable to resist pivoting movement of the rear arm about the upper rear arm pivot in response to movement of the rear slide rail pivot towards the underside of the snowmobile; and, Claim 5 d), column 12, line 7: "orerable" should read -- operable -- as shown below.
    d) a resilient element having an anterior end pivotally attached to the front linkage, the resilient element "~~orerable~~" operable to resist pivoting movement of the rear arm about the upper rear arm pivot in response to movement of the rear slide rail pivot towards the underside of the snowmobile; and, Signed and Sealed this Second Day of September, 2008

JON W. DUDAS
*Director of the United States Patent and Trademark Office*